United States Patent [19]

Babel

[11] Patent Number: 4,700,452
[45] Date of Patent: Oct. 20, 1987

[54] TOOL MAGAZINE

[75] Inventor: Werner Babel, Pfronten-Meilingen, Fed. Rep. of Germany

[73] Assignee: MAHO Aktiengesellschaft, Fed. Rep. of Germany

[21] Appl. No.: 743,607

[22] Filed: Jun. 11, 1985

[30] Foreign Application Priority Data

Dec. 28, 1984 [DE] Fed. Rep. of Germany ....... 3447706
Apr. 3, 1985 [EP] European Pat. Off. ........ 85104015.4

[51] Int. Cl.$^4$ ............................................. B23Q 3/157
[52] U.S. Cl. ..................................................... 29/568
[58] Field of Search ....................... 29/568; 408/31, 35; 211/1.5

[56] References Cited

U.S. PATENT DOCUMENTS

| 4,238,034 | 12/1980 | Sipek et al. | 29/568 |
| 4,358,888 | 11/1982 | Zankl et al. | 408/35 |
| 4,535,527 | 8/1985 | Fischer et al. | 29/26 A |

FOREIGN PATENT DOCUMENTS

| 73687 | 3/1983 | European Pat. Off. | 29/568 |
| 1904093 | 1/1969 | Fed. Rep. of Germany | |
| 2818018 | 4/1978 | Fed. Rep. of Germany | |
| 3017613 | 5/1980 | Fed. Rep. of Germany | |
| 155240 | 5/1982 | Fed. Rep. of Germany | 29/568 |
| 94951 | 6/1983 | Japan | 29/568 |
| 1408131 | 10/1975 | United Kingdom | 29/568 |
| 933373 | 6/1982 | U.S.S.R. | 29/568 |

Primary Examiner—Gil Weidenfeld
Assistant Examiner—Daniel W. Howell
Attorney, Agent, or Firm—Lahive & Cockfield

[57] ABSTRACT

The subject of the invention is a magazine, more particularly for milling and drilling machines, comprising a straight tool carrier (10) which has a row of separately swinging tool holding fixtures and which is hinged to the work table (6) so that it swings. For tool changes without additional tool changing means, according to the invention the tool carrier (10) is secured to the end of at least one swing arm (8) which is hinged to the work table so that it swings about a horizontal axis (9). As a result, the tool carrier (10), which can be turned about an axis which extends in the longitudinal direction thereof, can be swung from a home position, below the work table, into an upper, tool-exchange position.

10 Claims, 6 Drawing Figures

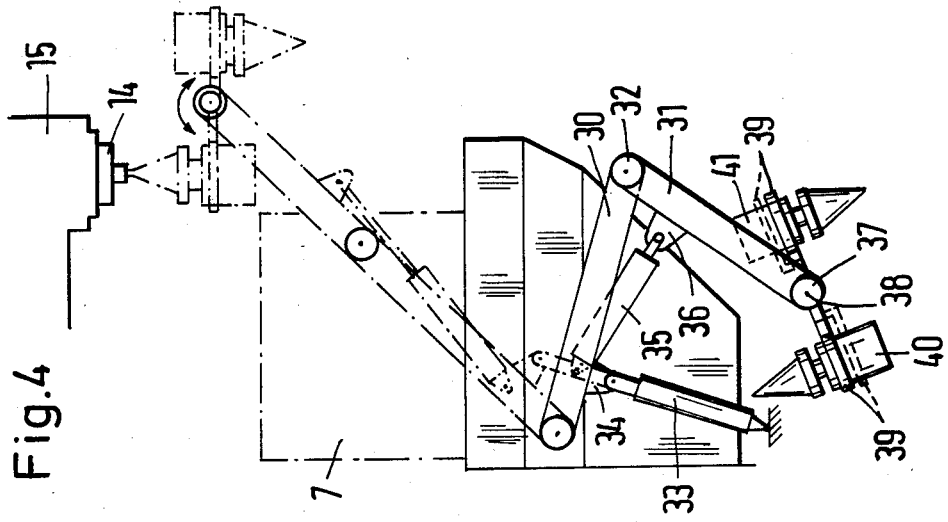
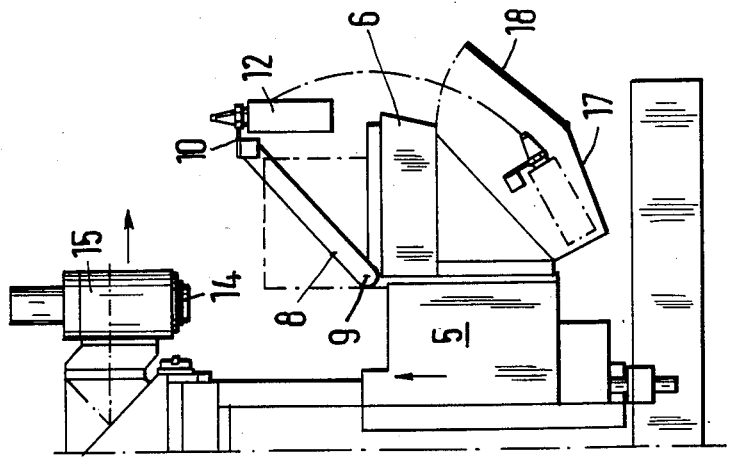

TOOL MAGAZINE

TECHNICAL FIELD OF THE INVENTION

The invention relates to a tool magazine, more particularly for milling and drilling machines, comprising a straight tool carrier which has a row of tool holding fixtures and which swings on the work table.

BRIEF DESCRIPTION OF THE PRIOR ART

A tool magazine of this type is already known ("KIWA" Maxzenter MM brochure), in which a tool carrier having a row of tool holding fixtures is secured to a column which moves together with the work table. From a home position to one side the carrier can swing about the longitudinal axis of the column to bring its tool holding fixtures into the tool exchange position in front of the tool spindle. However, in its home position at the side of the workpiece the tool carrier occupies a considerable amount of space and reduces the free area of side access to the workpiece during machining. Moreover in the case of relatively large clamped workpieces tool exchange cannot be performed as the tools collide with the workpiece as they swing into the exchange position.

OBJECT OF THE INVENTION

The object of the invention is to provide a tool magazine, more particularly for milling and drilling machines, by means of which the tools of the horizontal and vertical milling heads can be changed without separate changing devices even in the case of relatively large clamped workpieces, without encroaching upon the free area of access to the workpiece.

SUMMARY OF THE INVENTION

This object is achieved, according to the invention, by securing the tool carrier pivotably to the end of at least one swing arm that is hinged to the work table so that it swings about a horizontal axis.

The arrangement of the tool carrier on the work table according to the invention offers the advantageous possibility of being able to bring the tool carrier, with the tools, when not in use, below the level of the table at the side of or in front of the work table, so that there is no encroachment upon the region of free access to the workpiece on all sides. Advantageously, the length of the swing arms and the angle of traverse chosen are such that tool changes take place beyond any clamping space for the workpieces.

A preferred embodiment of the invention is characterised in that the tool carrier is secured by its two ends, each end to one swing arm, the swing arms being hinged to the two side walls of the work table so as to swing about a common horizontal axis. The tool carrier then forms, together with the two swing arms, a U-shaped bow frame which can be swung from the upper exchange position into a home position diagonally below the front end wall of the worktable in which the tool carrier, together with the tools sitting in its holding fixtures, is received in a box which can be closed by an end flap and is thus protected from soiling by drilling fluid, chips and the like.

So that the tools can be aligned with the axis of the horizontal spindle or of the vertical spindle when the tool carrier is swung up, the tool carrier can be swung by a motor about a horizontal axis, relative to the swing arm ends, so that the respective tool axis can be brought into alignment with the axis of the horizontal spindle or of the vertical spindle. For this purpose, in addition to the swinging movement of the tool carrier, translatory movements of the work table and of the respective tool spindle in three axial directions are necessary, the actual tool change taking place, after alignment, by means of a feed motion of the horizontal or vertical movement respectively along its longitudinal axis.

To prevent the spindle and/or the workpiece from colliding with adjacent tools when changing the tools in the horizontal spindle, the tool holding fixtures are advantageously arranged on the tool carrier so that they can swing individually about a horizontal axis.

In order to ensure that there is the desired large amount of free space for the workpieces when changing tools, an advantageous embodiment of the invention is characterised in that the swing arm or arms is or are hinged to the work table in the region of the upper edge of the table on the stand side. This enables long swing arms to be used, so that the tool exchange position is high enough to be above even the largest possible workpieces.

A further embodiment of the invention is characterised in that a single swing arm is hinged to the front end of the work table to swing about a horizontal axis, so that the tool carrier, secured at right angles thereto, together with the tools, are at the side of the work table in the home position.

Finally, in order to increase the range of movement of the swing arms and hence of the tool carrier, an embodiment in which the swing arms are of articulated lever or telescopic construction, e.g. are made up of cylinder-piston units, can be advantageous. This offers the possibility of departing from a circular swinging movement and of performing tool exchanges even in the case of clamped, oversize workpieces.

BRIEF DESCRIPTION OF THE DRAWINGS

Exemplary embodiments of the invention will now be described in detail with reference to the drawings, in which:

FIG. 3 shows the universal milling machine according to FIG. 1 during a vertical spindle tool change;

FIGS. 4, 4a show on a larger scale a tool magazine having two rows of tool holding fixtures and an articulated lever or telescoping linkage.

DETAILED DESCRIPTION OF PREFERRED EMBODIMENTS OF THE INVENTION

Figure 1:
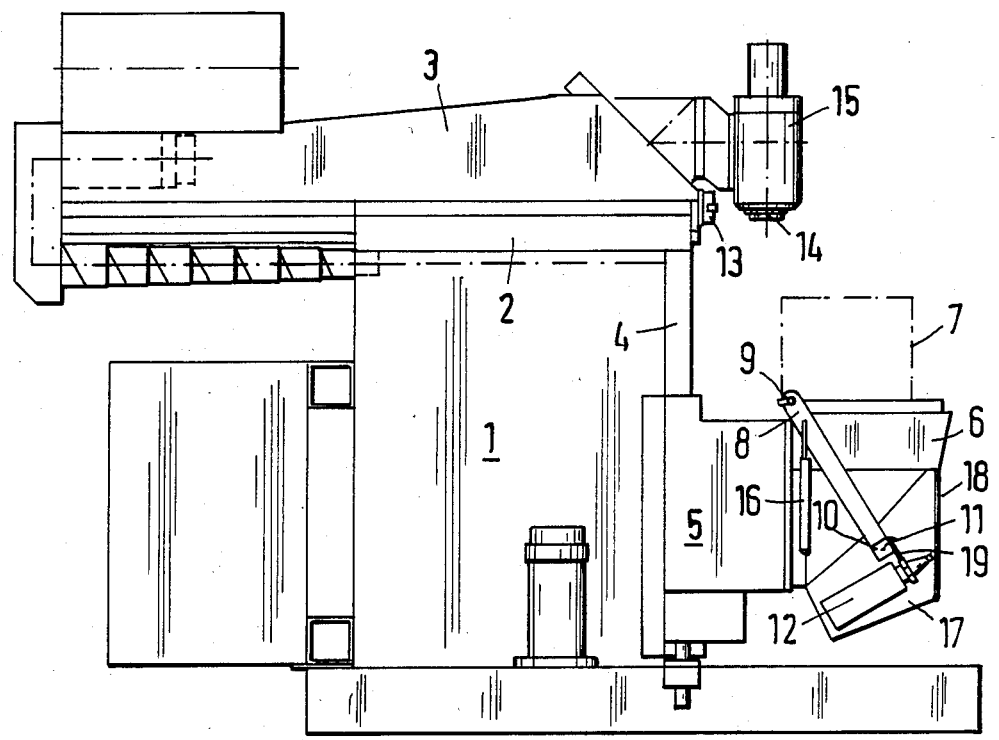
FIG. 1 shows a diagrammatic side view of a universal milling machine with the tool magazine swung into its home position.

The universal milling machine shown comprises a fixed torsion-resistant stand 1, having upper horizontal guideways 2 along which a spindle head 3, together with a drive motor, is guided to move longitudinally. Secured to the front end of the stand are vertical guide rails 4 on which a table console 5 is guided to move vertically. This table console 5 carries a work table 6 which can be moved in horizontal guideways (not shown) perpendicularly to the plane of the drawing. The working area of the tools and the area in which the workpieces are clamped on the work table 6 is indicated by a dot-dash border 7.

Figure 2:
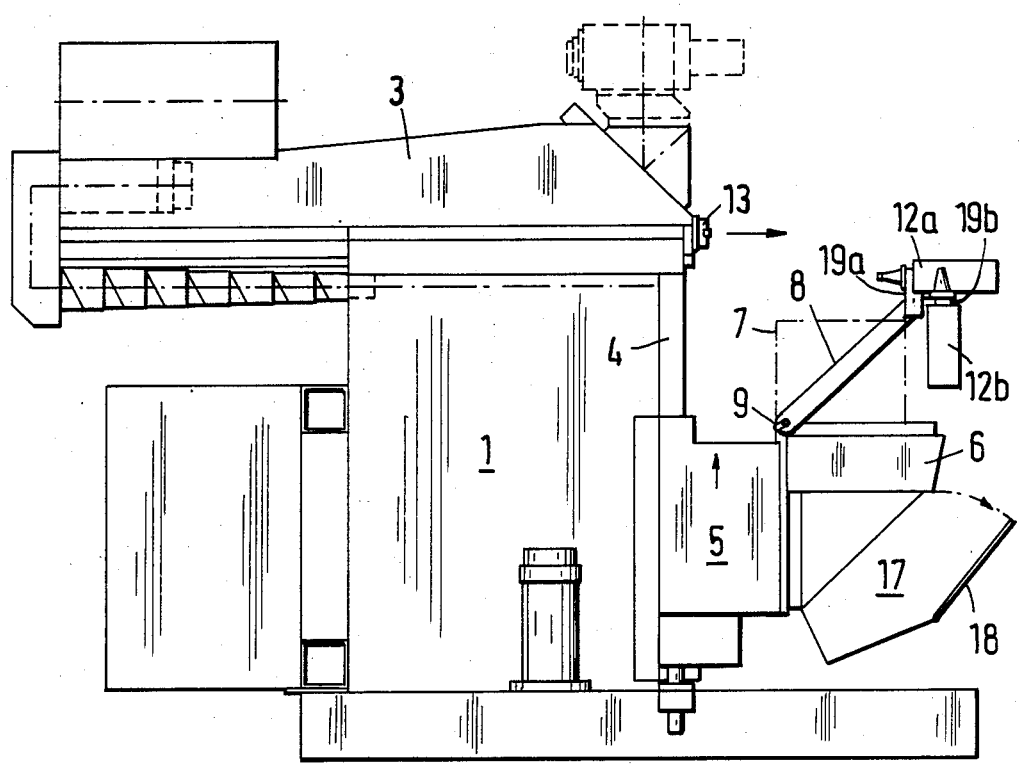
FIG. 2 shows the universal milling machine according to FIG. 1 during a horizontal spindle tool change.

As can be seen in FIGS. 1 to 3, in the region of the upper machine-side edge of the work table 6 a swing arm is linked thereto to swing at the side of the work table about a horizontal axis 9, a tool carrier 10 being secured to the free end so that it can turn about an axis 11. On this tool carrier 10 are arranged a row of individually swinging tool holding fixtures 19, open on one side, which allow automatic insertion of the tools 12 into the horizontal spindle 13 or the vertical spindle 14 of the vertical head 15 which pivots on a 45° surface of the spindle head 3 (cf. FIGS. 2, 3). A drive 16 which—as shown in FIG. 1—can be constructed as a piston-cylinder unit, is hinged to the work table 6 with its piston rod acting upon the swing arm 8. Below the overhanging work table 6 there is a box 17 with an end flap 18 in which the tool carrier 10 is received in the home position so that it is protected from chips and from drilling fluid.

To exchange the horizontal spindle tool, the tool carrier 10 is swung horizontally from the position shown in FIG. 1 into the exchange position according to FIG. 2 by actuating the drive 16, the flap 18 of the receiving box 17 swinging out. The angle of traverse of the swing arm 8, relative to the horizontal, is approximately 45°, the length of the swing arms being chosen so as to avoid collisions between the tool carrier 10 and the tools 12 on the one hand and the work table 6 and a workpiece clamped on the working area 7 during this swinging movement. When the swing arms 8 are hinged, as shown, to the upper table edge on the machine side, the length of the swing arm is greater than the depth of the work table 6 and the diagonal of the area 7. Translatory movement of the table 6 at right angles to the plane of the drawing, and a vertical movement of the console 5 on the guideways 4, cause the upswung tool carrier 10 to be positioned in such a way that a particular empty tool holding fixture 19 is aligned with the horizontal spindle 13. This empty tool holding fixture 19a is swung horizontally about the axis 11 so that its center line is in alignment with the axis of the horizontal spindle. A feed motion of the spindlehead 3 with the horizontal spindle 15 then causes the used tool 12a to be delivered to the tool holding fixture 19a. After the tool 12b is released by retracting the spindle head 3, the tool holding fixture 19a swings back, so that the used tool 12a is in the vertical position. To insert a fresh tool 12b, this process is repeated, i.e. the tool holding fixture 19b is aligned with the horizontal spindle 13 by displacement of the work table 6 with the upswung tool carrier 10, and a swinging movement of the tool holding fixture 19b about the axis 11 brings the fresh tool 12b from its vertical position into the horizontal, in alignment with the spindle axis. A further feed motion of the spindle head 3 causes the new tool 12b to be delivered from the tool holding fixture 19b to the horizontal spindle 13. After this exchange process, the tool carrier 10 is swung back into the home position, in the box 17, by means of the swing arms 8.

FIG. 3 shows a vertical spindle tool change. The individual movements take place as in the case of the tool change according to FIG. 2, alignment of the tool 12 being effected by a corresponding turning movement of the tool carrier 10, relative to the end of the swing arms 8, so that the tool to be changed is vertically aligned and its center line is in alignment with the longitudinal axis of the vertical milling head 15. In this embodiment, the movement disconnecting the used tool from the vertical spindle and connecting the fresh tool thereto is effected not by the spindle head 15, but by a corresponding vertical movement of the console 5. When there is a great enough spindle advance, however, it is even possible to effect this connecting movement by corresponding advance and retraction of the vertical spindle 14 in the spindle head 15.

In the tool magazine shown in FIG. 4 the two swing arms hinged to the sides of the work table each consist of two levers 30, 31 connected by an intermediate linkage 32. A linear drive 33, e.g. a cylinder, engages a bracket 34 attached to the lower lever 30 and swings this lever 30 from the lower position, shown in full lines, to the dotdash line exchange position. A further linear drive 35 is hinged to the lower lever 30 with its piston rod engaging a bracket 36 that projects laterally from the upper lever 31. At the free end of this upper lever 31 a tool carrier 37 is arranged so as to be rotatable about its longitudinal axis by 180° at a time. The tool carrier 37 of this embodiment of the magazine has two rows of tool holding fixtures 39 positioned axially symetrically and is thus designed for twice as many tools 40, 41 as the magazine according to FIGS. 1-3. As shown, only the tools of the vertical spindle 14 are changed by means of this magazine, which gives a substantial constructional simplification of the exchange mechanism. It has in fact been found in practice that the tools of the vertical spindle 14 need to be exchanged considerably more often than those of the horizontal spindle 13. For an automatic machining operation it is therefore often more advantageous only to exchange the tools of the vertical spindle in a program-controlled manner and with a magazine of double the storage capacity. Since the vertical head is as a rule narrower than the front part of the spindle head 3 that receives the horizontal spindle 13, the tool holding fixtures 39 can be arranged relatively close together on the tool carrier 37 without the vertical head 15 colliding with the tools held in the neighboring holding fixtures in the same row in the course of the tool exchange. With an equally close arrangement of the tool holding fixtures for the horizontal spindle as well as the tool to be exchanged at any particular time, the tools to be changed at any time must be moved, together with their tool holding fixtures, individually and separately into an exchange position so as to avoid collisions of the wider spindle head with neighboring tools in the magazine. However, these individual movements of tool holding fixtures require a relatively complicated driving mechanism. For correct positioning of the tool holding fixtures fixed to the 180° rotatable tool carrier, the tool carrier can also have a recessed profile part such as that shown with a broken line for the tool carrier in the swung-in rest position.

Figure 5:
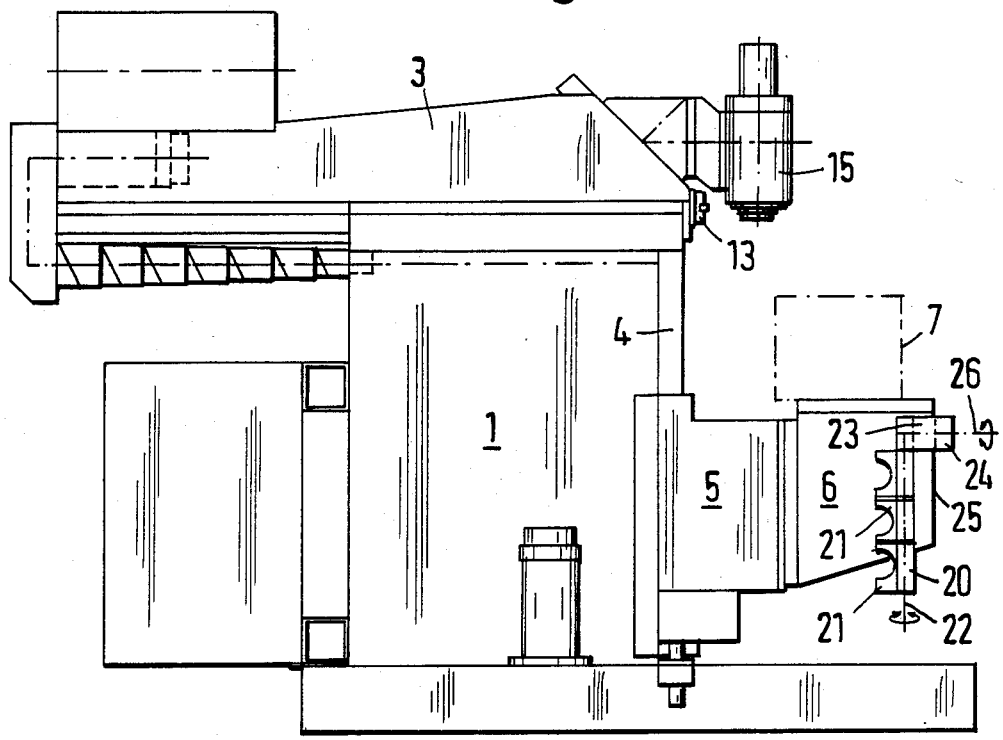
FIG. 5 shows the universal milling machine according to FIG. 1 with a tool magazine hinged to the front end.

In the embodiment according to FIG. 5, tool holding fixtures 21 arranged in a row on a tool carrier 20 can be turned individually about an axis 22 extending longitudinally of the carrier. The tool carrier 20 is secured to the angular end piece 23 of a swing arm 24 which is hinged by its free end, to the front end wall 25 of the work table 6 so that it swings about a horizontal axis 26. In order to change a tool this swing arm 24 can be swung horizontally about the axis 26 by means of a drive (not shown), e.g. a cylinder-piston unit according to FIG. 1, into a vertical position, so that the tool carrier 20 with the row of tool holding fixtures 21 and of tools 12 arranged therein, then extends horizontally in front of the spindle head. By means of appropriate travelling motions of the console 5, of the work table 6 and of the spindle head 3 and the spindles 13, 14 respectively and by means of turning movements of the respective tool holding fixtures 21, in each case the used tool can be removed from the horizontal or vertical spindle and can be replaced by a new tool.

Figure 4A:
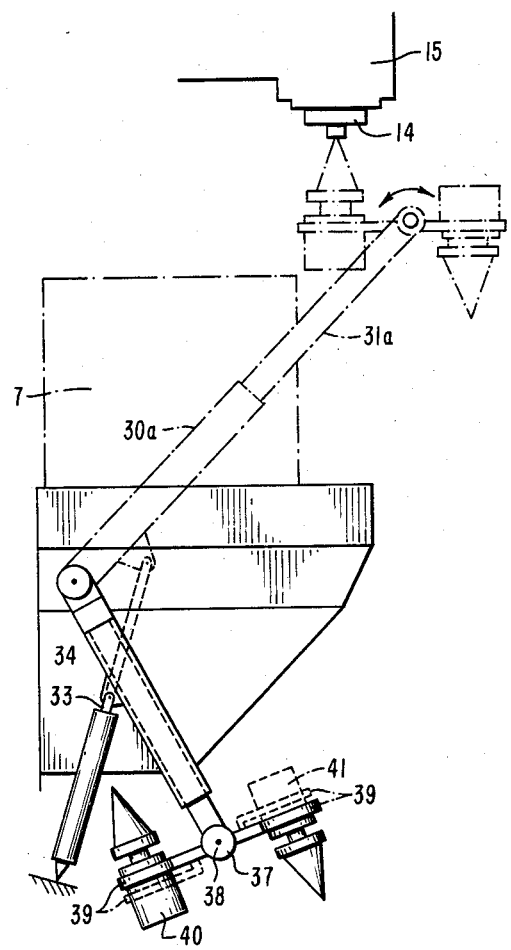

The invention is not limited to the exemplary embodiments represented. Thus, for example as shown in FIG. 4a, the swing arm can comprise two or more parts 30a, 31a which interlock telescopically and can thus be of varying length, thereby increasing the positioning possibilities in the starting position as well as in the tool-exchange position. In order, finally, to ensure reliable tool exchange processes, locking or clamping devices are provided which act, for example, upon the swing arms and fix the tool carrier in its starting position and also, more particularly, in the upswung, tool-exchange position.

What is claimed is:

1. A tool magazine, more particularly for milling and drilling machines having a movble work table, comprising at least one swing arm having a first and second ends, first means for attaching a said first end of a said swing arm to the work table for swinging motion about a first horizontal axis, a straight tool carrier which has a row of tool holding fixtures, and second means for pivotally attaching the tool carrier to the second end of said at least one swing arm for motion about a second axis parallel to the first axis so that by motion of said at least one arm and of said tool carrier about said first and second axes, respectively, a tool holding fixture is positioned for changing a tool of a spindle above said table, said tool carrier being movable into a home position in a closable box which is arranged under a front end wall of the work table.

2. A tool magazine according to claim 1, characterised in that each end of the tool carrier is secured to a swing arm, the swing arms being hinged to the two side walls of the work table so as to swing about a common horizontal axis.

3. A tool magazine according to claim 1, characterised in that the tool carrier is secured to the ends of the swing arms in such a way that it can rotate about a longitudinal axis.

4. A tool magazine according to claim 1, adapted to swing from an upper edge of the work table wherein the attaching means hinges the swing arm or arms to the work table in the region of the upper table edge on the stand side.

5. A tool magazine according to claim 1, adapted to swing from a front edge of the work table, wherein the attaching means hinges the swing arm to the front end of the work table so that it swings about a horizontal axis.

6. A tool magazine according to claim 1, characterized in that a swing arm includes plural telescopically extendable members.

7. A tool magazine according to claim 1, further including means for locking a swing arm in the home position and in a tool exchange position.

8. A tool magazine according to claim 1, wherein each said tool holding fixture includes movable means for individually attaching the fixture to the carrier for motion about an axis of the carrier.

9. A tool magazine according to claim 1, characterized in that each swing arm includes plural articulated levers and means for moving the levers about their articulations.

10. A tool magazine according to claim 1, having first and second rows of tool holding fixtures arranged on opposing sides of the tool carrier such that the respective rows of fixtures hold rows of tool turned at 180° to one another.

* * * * *